United States Patent
Laskowski

[19]
[11] Patent Number: 6,129,116
[45] Date of Patent: Oct. 10, 2000

[54] SEALING DEVICES

[75] Inventor: Henry Laskowski, London, United Kingdom

[73] Assignee: Convac, Ltd., Hertfordshire, United Kingdom

[21] Appl. No.: 09/214,357

[22] PCT Filed: Jul. 2, 1997

[86] PCT No.: PCT/GB97/01777

§ 371 Date: Jun. 30, 1999

§ 102(e) Date: Jun. 30, 1999

[87] PCT Pub. No.: WO98/01690

PCT Pub. Date: Jan. 15, 1998

[30] Foreign Application Priority Data

Jul. 3, 1996 [GB] United Kingdom .................. 9613955

[51] Int. Cl.⁷ .................................................. F16K 15/14
[52] U.S. Cl. .......................... 137/854; 137/526; 251/127
[58] Field of Search .................... 137/854, 853, 137/855, 526; 251/127, 118

[56] References Cited

U.S. PATENT DOCUMENTS

| | | | |
|---|---|---|---|
| 274,308 | 3/1883 | George | 137/854 |
| 2,270,469 | 1/1942 | Cosborn, Jr. | 137/854 |
| 2,655,178 | 10/1953 | Sarosdy | 137/614.2 |
| 3,228,418 | 1/1966 | Rosback et al. | 137/516.17 |
| 3,923,081 | 12/1975 | Persson | 137/526 |
| 3,990,439 | 11/1976 | Klinger | 137/854 |
| 4,204,555 | 5/1980 | Durling | 137/854 |
| 4,550,749 | 11/1985 | Krikorian | 137/843 |
| 4,711,224 | 12/1987 | Eckhardt | 123/572 |
| 4,749,003 | 6/1988 | Leason | 137/854 |
| 4,762,149 | 8/1988 | Pickl, Jr. | 137/843 |
| 5,794,915 | 8/1998 | Shimizu et al. | 251/127 |

FOREIGN PATENT DOCUMENTS

| | | | |
|---|---|---|---|
| 1001055 | 2/1952 | France | 5/1 |
| 2089550 | 1/1972 | France | F16K 1/00 |
| 195 45 452 | 11/1996 | Germany | F16K 15/14 |
| 916850 | 3/1982 | U.S.S.R. | 137/854 |
| 1 043 327 | 9/1966 | United Kingdom . | |
| 2 001 151 | 1/1979 | United Kingdom | F16K 15/14 |
| 1088047 | 3/1982 | United Kingdom | 137/854 |
| 2 109 092 | 5/1983 | United Kingdom | F16K 15/14 |

*Primary Examiner*—Gregory L. Huson
*Assistant Examiner*—Joanne Y. Kim
*Attorney, Agent, or Firm*—D'Alessandro & Ritchie

[57] ABSTRACT

A sealing device for a vacuum air opening (10) of a dust bag or other dust collecting container (5) for a vacuum cleaner, has an elastic membrane (1) deflected and centrally fixed in a vacuum air opening tube (4) by means of a fixing element (2). Deflection of the flexible membrane (1) produces forces acting upon a partspherical surface (7) of the vacuum air opening tube (4), sufficient enough to ensure tight sealing of the vacuum air opening (10) and preventing any spillage of dust through the opening (10). The elastic membrane (1) is protected by a dome (3) with an opening (6) for vacuum air flow. Alternatively the membrane (1) may be mounted on a stem element (9) extending from the dome (3).

9 Claims, 1 Drawing Sheet

SEALING DEVICES

The present invention relates to sealing devices, and more particularly to a device for sealing an opening in a container of a vacuum cleaner or other suction device for collecting dust or other fine material. A preferred embodiment is suitable for picking up and collecting fine toner particles from a photocopying machine.

A problem with suction devices for collecting toner particles is leakage of the toner from the collecting bag or other container. Because the particles are so fine, even the slightest imperfection in a seal leads to escape of the toner and a consequent mess. Existing containers are provided either without any closure member or with a closure member which has one or more disadvantages.

G.B. Patent Application 2109092 discloses a dust filter bag with a check valve flap of resilient material which is hinged at one side and is biassed to close an opening. However, such an arrangement can have uneven sealing pressure around the edges of the flap and dust particles, or other contaminants, could accumulate around the hinge leading to possible incomplete closure of the flap.

The disclosure of GB 1043327 is also relevant, but this relates to a different technical field from the present invention. Here, the sealing device is associated with an inlet for air or other gas which diffuses into a liquid. To assist satisfactory aeration, part of the inlet has a hyperboloid shape. A sealing cover for the inlet is mounted on a central bolt (FIG. 3) or on radially extending ribs (FIGS. 4 and 5).

The present invention seeks to provide an improved sealing arrangement.

According to a first aspect of the present invention, there is provided a sealing device comprising a resilient closure member arranged in a fluid flow passage. wherein the closure member can be selectively opened, to allow the passage of air. or closed by seating against a peripheral surface of a wall of the passage. characterised in that a dome is provided integral with the passage and located downstream of the closure member in the direction of fluid flow and arranged to direct the flow of material, and in that the closure member is supported at a central region thereof by a stem element mounted on the dome.

A particular advantage of this arrangement is that there is no obstacle upstream of the closure member which could cause clogging or build-up of dust etc which might interfere with the sealing action. For example if a piece of string or other material snags at a location upstream of the closure member it could permanently extend through the closure orifice and prevent correct seating of the closure member, leading to leakage of dust. By locating the stem element downstream of the closure member, any snagged items or clogged materials are clear thereof. Thus they do not interfere with closure of the member and there is a good chance that, when the member is opened again, any blockage or snagging is cleared by the next flow of air. This support arrangement for the closure member constitutes a separate aspect of the present invention.

The dome protects the closure member from accumulations of dust and also creates an air flow downstream of the closure member to carry dust well away therefrom.

According to a second aspect of the present invention there is provided a sealing device for suction cleaning apparatus comprising a generally circular resilient closure member arranged in a passage for dust-carrying air, wherein the closure member can be selectively opened, to allow the passage of air, or closed by seating against a peripheral surface of the passage, the peripheral surface constituting part of a sphere, characterised in that the closure member is protected from dust or other fine material by a dome arranged to direct the flow of material, and in that the closure member is held by an element such that it is depressed when it engages the peripheral surface and its edges engage the surface with a contact pressure.

The part-spherical nature of the peripheral valve-sealing surface ensures that an optimal seal is provided over the entire surface. There is no tendency for an increase in pressure to cause the edges of the closure member to curl or bend away from the peripheral surface as in the case of planar or other non-spherical shapes.

In a preferred arrangement, the peripheral surface is in the form of a relatively narrow ring adjacent to the passage wall. This leaves a large central orifice to permit a high flow of air, while achieving a high-quality seal.

Preferably, the arc subtended by the part-spherical surface at the centre of the notional sphere amounts to 2° to 20°, preferably 5° to 10°.

In a preferred arrangement, the closure member is supported at a central region thereof by one or more spokes extending from the wall of the passage in a spidertype arrangement. This arrangement provides a uniform sealing effect around the entire circumference of the closure member.

Preferred embodiments of the invention will now be described by way of example only, with reference to the accompanying drawings, of which:

FIG. 1 snows a cross-section of a sealing device in accordance with a first embodiment;

Figure 1:
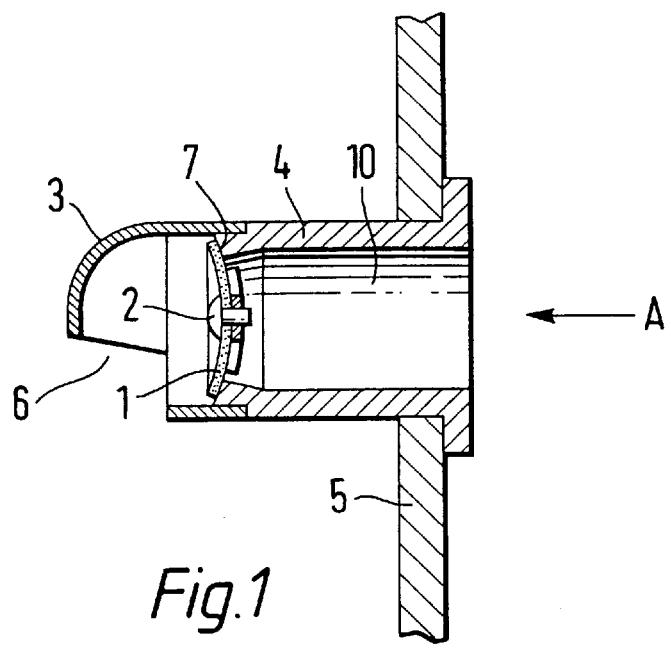

As shown in FIG. 1, the sealing device of a vacuum air opening for a dust bag or other dust collecting container comprises a closure member in the form of an elastic membrane 1 held in position by a fixing element 2, a protective dome 3 with one or more openings 6 for a vacuum air flow, a vacuum air flow tube 4 with a part-spherical surface 7, and a dust bag or other dust collecting container wall 5.

Figure 2:
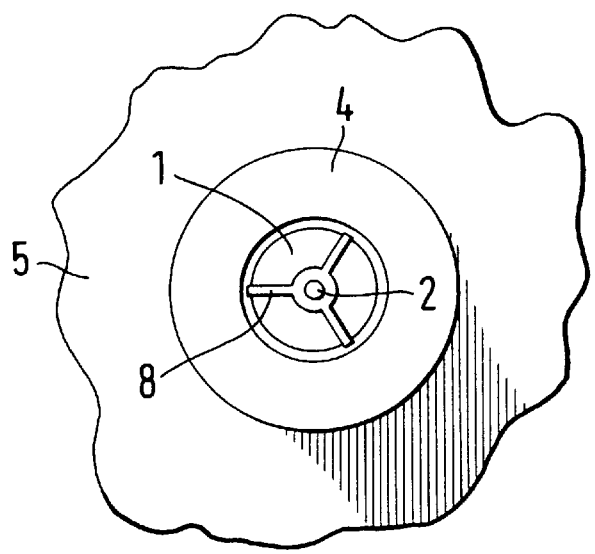
FIG. 2 shows a view A of the sealing device of FIG. 1.

FIG. 2 shows the fixing of the elastic membrane 1 into the vacuum air opening tube 4, by means of one or more spokes 8, directed to the centre of the tube 4. where the fixing element 2 of the elastic membrane 1 is located. As shown in FIG. 1, element 2 holds the centre of the membrane 1 slightly to the right of a straight line joining the top and bottom of surface 7. This means that the membrane 1 is slightly depressed and its edges engage the surface 7 with a suitable contact pressure.

The dome 3 directs dust-laden air in a turbulent flow away from the closure orifice. It also protects the orifice from circulating dust returning to the orifice and clogging it.

Deflection in the centre of the elastic membrane 1 increases the rigidity of the membrane and provides sufficient contact force acting on the spherical surface 7 to obtain a tight sealing of the vacuum air opening tube 4 and to prevent any spillage of dangerous dust through a vacuum air opening 10 of a dust bag or other dust collecting container 5.

Under normal working conditions of a vacuum cleaner, the elastic membrane 1, due to its elasticity, deflects (to the left in FIG. 1 ) even further allowing mixture of air and dust to flow from right to left freely between the spherical surface 7 of the vacuum air opening tube 4 and the elastic membrane 1. Even the smallest reversed pressure of air or dust particles on the concave surface of the elastic membrane 1. increases forces acting upon the spherical surface 7. This even more increases the sealing action of the mechanism which effectively stops dust escaping from the dust bag or other dust collecting container 5.

Figure 3:
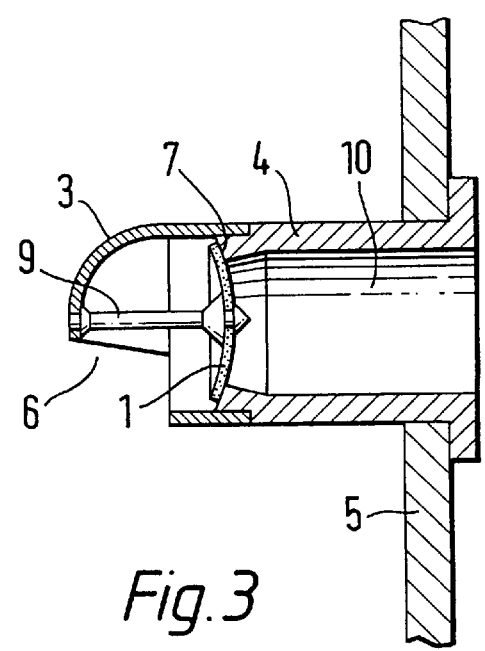
FIG. 3 shows a cross-section of a sealing device in accordance with a second embodiment.

In FIG. 3 is shown another embodiment in which the elastic membrane 1 is fixed to the vacuum air opening tube 4 by means of a single supporting stem or pole element 9, fixed to the protective dome 3. Again the centre of the membrane 1 is held in a position to exert suitable contact pressure on surface 7.

The sealing devices as shown in FIG. 1 or 3, and described above, can each be constructed as a permanent or fully removable part of a dust bag or other dust collecting container 5. Conventionally, such containers have a removable cap to prevent dust entering the container during storage before use. The incorporation of a sealing device in accordance with the invention avoids the need for this extra cap, since it already provides an effective and long-acting seal. It can also form a part of a vacuum cleaner itself onto which a dust bag or other dust collecting container is fixed.

The above-described sealing devices are especially suitable for use in apparatus for cleaning up and collecting toner particles from photocopying machines. Container 5 may be a replaceable cartridge for insertion in a corresponding vacuum-cleaning device. By preventing any toner leakage, they contribute to a clean and healthy environment. It can also be used to collect asbestos material or any particulate matter.

In modifications, the surface 7 may have a planar, conical or other curved configuration; however the sealing effect is not as effective as with a surface forming a section of a sphere. Dome 3 may be omitted: if desired stem element 9 may be angled and extend directly from the wall of passage 4.

What is claimed is:

1. A sealing device comprising a resilient closure member (1) arranged in a fluid flow passage (4), wherein the closure member can be selectively opened, to allow the passage of air, or closed by seating against a peripheral surface (7) of a wall of the passage, characterised in that a dome (3) is provided integral with the passage (4) and located downstream of the closure member in the direction of fluid flow and arranged to direct the flow of material, and in that the closure member is supported at a central region thereof by a stem element (9) mounted on the dome (3).

2. A sealing device according to claim 1, wherein the peripheral surface (7) constitutes part of a sphere.

3. A sealing device according to claim 2, wherein the part-spherical surface (7) forms a complete ring around the internal wall of the passage (4).

4. A sealing device according to claim 3, wherein the arc subtended by the part-spherical surface at the centre of the notional sphere amounts to 2° to 20°.

5. A dust collecting container having an inlet aperture sealed by a sealing device in accordance with any of claims 1 to 4.

6. A suction cleaner having an aperture sealed by a sealing device in accordance with any of claims 1 to 4.

7. A sealing device for suction cleaning apparatus comprising a generally circular resilient closure member (1) arranged in a passage (4) for dust-carrying air, wherein the closure member can be selectively opened, to allow the passage of air, or closed by seating against a peripheral surface (7) of the passage, the peripheral surface (7) constituting part of a sphere, characterised in that the closure member (1) is protected from dust or other fine material by a dome (3) arranged to direct the flow of material, and in that the closure member (1) is held by an element (2,9) such that it is depressed when it engages the peripheral surface (7) and its edges engage the surface (7) with a contact pressure.

8. A sealing device according to claim 7, wherein the holding element (9) is a stem which is mounted on the dome (3).

9. A sealing device according to claim 7, wherein the closure member (1) is supported at a central region thereof by one or more spokes (8) radially extending from the internal wall of the passage (4).

* * * * *